US005111411A

United States Patent [19]

Browne

[11] Patent Number: 5,111,411

[45] Date of Patent: May 5, 1992

[54] OBJECT SORTING SYSTEM

[75] Inventor: Arthur Browne, Horley, England

[73] Assignee: U.S. Philips Corporation, New York, N.Y.

[21] Appl. No.: 226,565

[22] Filed: Aug. 1, 1988

Related U.S. Application Data

[63] Continuation of Ser. No. 684,321, Dec. 20, 1984, abandoned.

[30] Foreign Application Priority Data

Jan. 9, 1984 [GB] United Kingdom ................ 8400436

[51] Int. Cl.[5] ........................ G06K 9/38; G01N 21/00

[52] U.S. Cl. .................................... 364/559; 364/564; 382/18; 382/48; 356/379

[58] Field of Search ............... 364/478, 479, 555, 559, 364/564; 382/8, 20, 25, 48, 51, 18; 209/586, 587, 598, 939; 250/221.1, 223 R; 356/379, 380, 385

[56] References Cited

U.S. PATENT DOCUMENTS

| | | | |
|---|---|---|---|
| 3,634,823 | 1/1972 | Dietrich et al. | 382/18 |
| 3,639,728 | 2/1972 | Helfand et al. | 364/478 |
| 3,652,989 | 3/1972 | Poddig et al. | 382/48 |
| 3,761,876 | 9/1973 | Flaherty et al. | 382/48 X |
| 3,860,909 | 1/1975 | Demonte | 382/25 |
| 3,868,635 | 2/1975 | Shah et al. | 382/18 |
| 4,132,314 | 2/1979 | von Beckmann et al. | 364/478 |
| 4,155,072 | 5/1979 | Kawa | 382/20 |
| 4,187,545 | 2/1980 | Wallace et al. | 364/559 |
| 4,208,652 | 6/1980 | Marshall | 382/18 |
| 4,218,673 | 8/1980 | Yoshida | 382/18 |
| 4,288,779 | 9/1981 | Otsu et al. | 382/18 |
| 4,414,566 | 11/1983 | Peyton et al. | 209/939 X |
| 4,477,926 | 10/1984 | Linger et al. | 382/8 |
| 4,490,848 | 12/1984 | Beall et al. | 382/25 |
| 4,567,610 | 1/1986 | McConnell | 382/18 |
| 4,581,762 | 4/1986 | Lapidus et al. | 364/559 |
| 4,589,140 | 5/1986 | Bishop et al. | 382/8 |
| 4,606,065 | 8/1986 | Beg et al. | 382/18 |
| 4,623,256 | 1/1986 | Ikenaza et al. | 382/8 |
| 4,624,367 | 11/1986 | Shafer et al. | 382/25 X |
| 4,648,053 | 3/1987 | Fridge | 382/8 |
| 4,651,341 | 3/1987 | Nakashima et al. | 382/8 X |
| 4,687,107 | 8/1987 | Brown et al. | 364/560 X |
| 4,703,512 | 10/1987 | Saka et al. | 382/25 X |
| 4,784,493 | 11/1988 | Turcheck, Jr. et al. | 364/559 X |

OTHER PUBLICATIONS

Gregory, R. A., "Lattice Type Character Recogntion", *IBM Tech. Discl. Bull.*, vol. 4, No. 12, May 1962, pp. 97-98.

Cronshaw, "A Practical Vision System for Use with Bowl Feeders", *Proceedings of the First Int'l Conf. on Assembly Automation*, pp. 265-274, Brighton, Eng. Mar. 1980.

*Primary Examiner*—Parshotam S. Lall
*Assistant Examiner*—Joseph L. Dixon
*Attorney, Agent, or Firm*—Brian J. Wieghaus

[57] ABSTRACT

Object sorting systems are known which use a vision based system programmed by an operator who selects those features of the object which will be used in the sorting test. In the invention, detailed feature selection by a human programmer is avoided, the features being selected automatically in a system which is shown examples of the desired and undesired objects. Typically, a linear array camera 5 scans the objects 18 in a rectangular raster, created by the motion of the object along a track 1 and in contact with a fence 2, to generate a binarized picture of the object comprising rows and columns of binary picture elements (pixels). In a learning mode, a master set of features is derived as a reference set of distinguishable columns of the picture. In the sorting mode, the corresponding set of columns of an unknown object are compared with the reference set to determine acceptance or rejection of the object.

17 Claims, 9 Drawing Sheets

| | | | | | | | | | | |
|---|---|---|---|---|---|---|---|---|---|---|
| 64 bts: | BBBW | WWBW | WWBB | BBBB | BWBW | WBWW | WBBB | WBBW | .... | .... |
| 16 bts: | B | W | X | B | X | W | B | X | . | . |

FIG. 3a

| | | | | | |
|---|---|---|---|---|---|
| | | | | | Cod |
| tabl : | BBBB | BBBB | BBXW | WWWW | D |
| | BBBB | BBBB | BBXX | WWWW | E |
| | BBBB | XXWW | XXBX | WWWW | F |
| | BBBX | XWWW | WXBX | WWWW | G |
| | | | | | Mtchs |
| Conc scns: | BBBB | BBBB | BBXW | WWWW | D (& E) |
| | BBBB | BBBB | BBWX | WWWW | E |
| | BBBB | BBBB | BXWX | WWWW | - |
| | BBWX | XXWW | XXBX | WWWW | - |
| | BBBB | BWWW | WXBW | WWWW | F (& G) |

FIG. 3h

H H H ~~B~~ D D D D D E E E E E E E E E E E
E E E E E D D D C ~~C~~ C C C C C C D D D D } LONG SIGNATURE
A A A ~~B~~ ~~C~~ A E E E A E A A B B B B ~~A~~ B B

H D E E E D C C D A E A B } SHORT SIGNATURE

FIG. 3e

Master A H D E E B E C C D E A E B

H D E E E D C C D A E A B Scre = 11/13 = 84%

FIG. 3g

| | | | | |
|---|---|---|---|---|
| Orig | BBBB | WWWW | WXBB | WWWW |
| Tol | BBBX | XWWW | WXBX | XWWW |
| | | | | |
| Orig | BBBB | BBBW | WBBW | WWWW |
| Tol | BBBB | BBXX | WXBX | WWWW |
| " | BBBB | BBXW | XBXX | WWWW |
| | | | | |
| Orig | BBWW | BBBW | XWWX | BXWW |
| Tol | BXXW | XBXW | XWWX | BXWW |
| " | BXWX | XBXW | XWWX | BXWW |

FIG. 3c

| | scnnd | | | | Scre |
|---|---|---|---|---|---|
| 1 | WBBW | WWWW | WWWW | WWWW | 388 |
| 2 | BBBW | WWWW | WWWW | WWWW | 307 |
| 3 | BBBB | BWWW | WWWW | WWWW | 171 |
| 4 | BBBB | BBBB | BBXW | WWWW | 110 |
| 5 | BBBB | BBBB | BBBW | WWWW | 97 |
| 6 | BBBB | BWWW | WBBW | WWWW | 92 |
| 7 | BBBB | WWWW | WXBX | WWWW | 92 |
| 8 | WBBB | BWWW | WWWW | WWWW | 79 |
| 9 | BBBB | BBBW | WWWW | WWWW | 72 |

FIG. 3b

| Tol | | | | Id |
|---|---|---|---|---|
| WXBX | WWWW | WWWW | WWWW | 1 |
| WBXX | WWWW | WWWW | WWWW | 1 |
| BBXX | WWWW | WWWW | WWWW | 2 |
| BBBB | XXWW | WWWW | WWWW | 3 |
| BBBB | BBBB | BBXW | WWWW | 4 |
| BBBB | BBBB | BBXX | WWWW | 5 |
| BBBB | XXWW | XXBX | WWWW | 6 |
| BBBB | XXWW | XBXX | WWWW | 6 |
| BBBX | XWWW | WXBX | WWWW | 7 |

FIG. 3d

| | | | | | | | | | | | | | | |
|---|---|---|---|---|---|---|---|---|---|---|---|---|---|---|
| Scre | 4 | 4 | 2 | 4 | 4 | 3 | 2 | 3 | 3 | 4 | 2 | 4 | 4 | |
| Mstr | A | A | B | C | E | A | D | E | B | J | F | D | E | |
| | | | | | | | | | | | | | | |
| Nw | A | A | B | E | C | E | B | D | E | B | J | D | E | F |
| | | | | | | | | | | | | | | |
| Nw mstr | A | A | B | E | C | E | A | D | E | B | J | F | D | E |
| Scre | 5 | 5 | 3 | 1 | 5 | 5 | 3 | 3 | 4 | 4 | 5 | 2 | 5 | 5 |

FIG. 3f

| | | | | | | | | | | | |
|---|---|---|---|---|---|---|---|---|---|---|---|
| 64 bts | | cam | BBBW | WWBW | WWBB | BBBB | BWBW | WBWW | WBBB | WBBW | .... |
| 16 bt | Blck | wrd | 1 | 0 | 0 | 1 | 0 | 0 | 1 | 0 | . |
| 16 bt | Whte | wrd | 0 | 1 | 0 | 0 | 0 | 1 | 0 | 0 | . |

FIG. 3j

| | | | | | | | | | |
|---|---|---|---|---|---|---|---|---|---|
| | | Blck | wrd | | | Whte | wrd | | Id |
| ref tble | 1111 | 1111 | 1100 | 0000 | 0000 | 0000 | 0001 | 1111 | D |
| | 1111 | 1111 | 1100 | 0000 | 0000 | 0000 | 0000 | 1111 | E |
| | 1111 | 0000 | 0010 | 0000 | 0000 | 0011 | 0000 | 1111 | F |
| | 1110 | 0000 | 0010 | 0000 | 0000 | 0111 | 1000 | 1111 | G |
| Cond scns | 1111 | 1111 | 1100 | 0000 | 0000 | 0000 | 0001 | 1111 | D (& E) |
| | 1111 | 1111 | 1100 | 0000 | 0000 | 0000 | 0010 | 1111 | E |
| | 1111 | 1111 | 1000 | 0000 | 0000 | 0000 | 0010 | 1111 | - |
| | 1100 | 0000 | 0010 | 0000 | 0010 | 0011 | 0000 | 1111 | - |
| | 1111 | 1000 | 0010 | 0000 | 0000 | 0111 | 1001 | 1111 | F (& G) |

FIG. 3k

OBJECT SORTING SYSTEM

This is a continuation of application Ser. No. 684,321 filed Dec. 20, 1984, now abandoned.

BACKGROUND OF THE INVENTION

1. Field of the Invention

The invention relates to a system for sorting objects from among a mixture of objects of a limited number of kinds. More particularly, it relates to a sorting system in which the objects are presented for inspection and classification in a limited number of possible orientations. Such a system may be used for sorting components into specific orientation for further processing or for automatic assembly into larger units.

2. Description of the Prior Art

In some cases, the orientation of components can be maintained from a previous process, the components being loaded into a magazine. But processes such as deburring, plating or even bulk storage may lead to randomly orientated components. Mechanical systems exist for orientated feeding, such as known vibratory bowl feeders or rotating drums. However the output tracks and component deflection devices of such systems have to be specially designed for each component.

To avoid special track and deflector design a vision-based system may be used to view the components and to make a sorting decision based on a computer processing of the image provided by such a vision system. Such a system is described in the article "A practical vision system for use with bowl feeders", Proceedings of the First International Conference on Assembly Automation, A. J. Cronshaw et al, pages 265-274, Brighton, England, March 1980. In this system, the component is moved transversely relative to a linear array of photodetectors which are scanned repetitively to provide a binarized picture of the component. In use, the system is shown good components and the binarized picture is displayed to a programmer with knowledge of the component. Using a light pen, specific features are selected for incorporation in a set of templates which are subsequently used for testing further components of unknown quality. It is a disadvantage that a skilled programmer is required. It is an object of the invention to provide an object sorting system in which it is only necessary to present examples of desired and unwanted objects to the system in a learning mode, after which sorting can be carried out, without the operator having any knowledge of the object features.

SUMMARY OF THE INVENTION

The invention provides an object sorting device comprising means for scanning successive objects each in a raster to derive a raster waveform of each object, means for binarizing the waveform into a picture comprising rows and columns of binary pixels, feature extraction means for extracting selected features from the binary picture, storage means for storing a master set of features and comparison means for comparing the selected features with the master set of features to derive a binary object sorting signal, characterized in that the system comprises means for deriving the master set of features by scanning a reference object, in that said feature extraction means comprise run counting means for counting a run of successive identical pixel columns and for outputting only those runs having a predetermined minimum length to form selected features, and in that the sorting signal is derived from a comparison of the succession of features of the master and unknown sets. A feature is defined as a run of successive identical pixel columns and the minimum run length is preferably two columns.

The device may be characterized in that where a first run of a first identity of columns is followed by a second run of a second identity of columns and the first and second runs are separated by two intervening columns having in sequence the second and the first identity, these two intervening columns are interchanged and each joined with the run of columns having the same identity. Errors at the junction between two long consecutive runs due to scanning errors are thereby reduced.

The device may be further characterized in that said feature extraction means have sequence warping control means to ignore non-conforming pixel columns of the outputted object pixel columns and/or the stored master pixel columns for the comparison. This has the effect of further reducing scanning errors.

The device may also be characterized in that said feature extraction means comprises forming means connected to an output of said counting means for compressing outputted run lengths of identical pixel columns between predetermined respective limits into predetermined array columns to be compared to a set of reference array columns. This has the effect of reducing the length of the master reference array, or reference set of identities, and facilitating the comparison of the reference and unknown arrays.

The composition of the reference array can be improved in such a sorting system which is characterized in that the succession of identities comprising the master array is derived from a plurality of successions obtained by scanning the plurality of reference objects, in that the first succession is taken as a first version of the reference array, in that the following succession is compared with the first version, new identities present in the following succession being inserted between corresponding runs of identities in the two successions to form a second version of the reference array, and in that each following succession of the plurality of successions is compared with the preceding version of the reference array in like manner to produce a final version of the reference array.

The means for scanning the object in a raster may comprise one of the known forms of television camera. In this event the video waveform from the camera is thresholded and sampled at intervals along each line of the television raster to provide the binarized picture. But in component sorting systems the components are often delivered in fairly steady linear motion along a track from, for example, a bowl feeder. In this event, an object sorting system in accordance with the invention may be characterized in that the means for scanning the object in a raster comprise means for moving the object linearly relative to a transverse linear array of photodetectors, the outputs of the photodetectors being sampled in sequence along the photodetector array at intervals throughout the relative motion to provide the raster waveform, and in that the means for binarizing the waveform comprise means for applying the output of each photodetector sample to a threshold level and for assigning one binary value to the sample if it equals or exceeds the threshold level and for assigning the other binary value if it is less than the threshold level, one sampling of the photodetector array giving rise to one column of binary picture elements and the sampling of the photodetector array throughout the linear relative motion giving rise to rows of binary picture elements.

It is a feature of the method of processing the image provided by the linear array camera that the compressed signatures developed are relatively insensitive to the speed changes of any one object while it is being scanned and also to differences in speed between objects.

BRIEF DESCRIPTION OF THE DRAWING

An embodiment of the invention, in which a collection of identical objects are binary sorted into a preferred orientation and all other orientations will now be described by way of example, with reference to the accompanying drawing, in which.

DESCRIPTION OF THE PREFERRED EMBODIMENT

Figure 1:
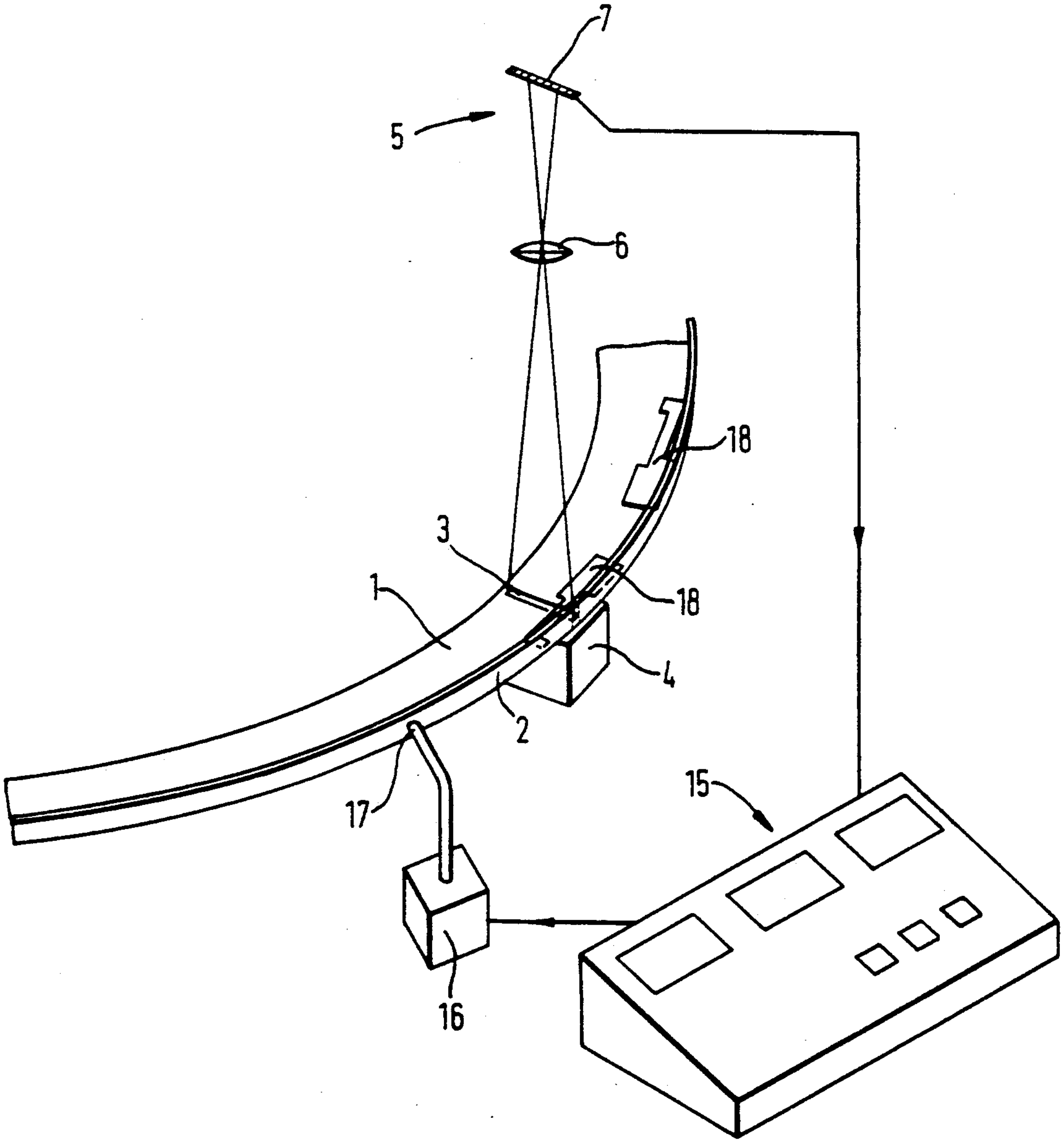
FIG. 1 shows a schematic perspective view of the optical, mechanical and electronic arrangements of an object orientation sorter.

Referring to FIG. 1 there is shown a portion 1 of the curved track of a vibratory bowl component feeder. Such feeders are well known in the component handling art and will not be described further. Reference may be had to the textbook "Handbook of feeding and orienting techniques for small parts" by G. Boothroyd, University of Massachusetts, for a description of bowl feeders. The action of the bowl feeder presents a succession of components or objects 18, in random orientation, sliding along the track against a fence 2. The surface of the track is inclined downwards toward the junction with the fence so that the object is maintained in registration with the fence. Thus the fence defines the orientation of the component and its position across the track. Also, the length of the track is inclined downwardly in the desired direction of motion of the objects. This need not be so since vibratory feeders can be designed to move objects up a sloping track.

Figure 2:
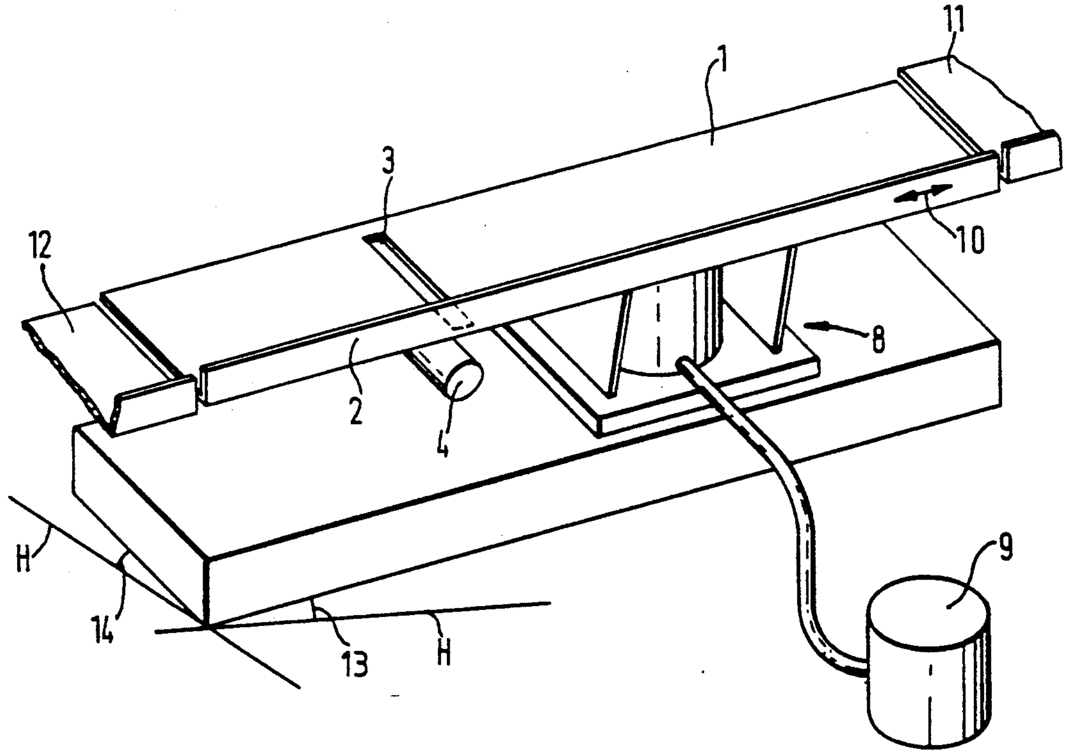
FIG. 2 shows a more detailed view of the sorter in the vicinity of the scanned slot, FIGS. 3*a* to 3*k* inclusive show the binary patterns derived during scanning, learning and sorting objects.

A slot 3 is provided in the track illuminated from below by a light box 4. Above the track a camera 5, comprising a lens 6 and a linear array of photodetectors 7, is provided for scanning the length of the slot and the thickness of the fence, which is increased locally to extend beyond the end of the image of the linear array. The portion 1 of the track in the locality of the slot 3 is mechanically separate from the remainder of the track. FIG. 2 shows this portion of the track in more detail. The track portion 1 is mounted upon a linear vibratory feeder 8 which imports a linear vibratory motion to the track portion 1 in the direction 10 along its length. The track portion 11 of the bowl feeder (not shown) is arranged to feed components onto the portion 1 and scanned components are fed to the track portion 12. In FIG. 2, the vibrator 8 is fed from a variable transformer 9. The amplitude of the motion 10 is adjusted so that the components are speeded up on landing on portion 1 so that they are separated, allowing each component to be scanned separately. The inclinations 13 and 14 of the track to the horizontal H are shown which maintain a component against the ledge and moving from right to left.

Alternatively, the track of the bowl feeder alone may be used to produce component separation by incorporating slope changes in the track. A hump, for example, will act to hold components momentarily, each component accelerating away from the others as it clears the hump.

The camera 5 (FIG. 1) is shown only schematically as a lens 6 which focuses the plane of the slot 3 onto the linear array of photodetectors 7. Typically the photodetector array comprises a 128 photodiode linear array sensor, for example a Reticon (Trade Mark) type RL128G. The lens focal length and the imaging distances are chosen in this example so that the detector separation, as imaged on the track, is 0.4 mm so that 64 detectors cover a slot length of 25.6 mm. For the objects to be sorted in this example some 64 consecutive photodiodes are sufficient to cover the maximum object width which will be encountered. It should be noted that the scan need not cover the entire vertical dimension of the object. The top of the object remote from the fence may contain little detail which renders the orientation of the component distinctive and may be discarded by a scan which falls short of the top of the object. The clock period of the array is 5 μs, and the time between scans is 4 ms. Most of the time between scans is used to process the results of each scan.

With the slot 3 illuminated from below, the brightness contrast is very high between the bright open slot and the darkness provided by a component. The camera, however, also contains a thresholding circuit not shown which applies a threshold level to each photodiode output corresponding to a brightness midway between the open and dark slot. The output of each photodiode is therefore reduced to a binary signal, WHITE or BLACK. Also, since the photodiodes are spaced apart and scans of the photodiode array take place after a finite movement of the object, the array and object movement result in a binarized picture of the whole component comprising columns of binary picture elements parallel to the photodetector array length. The columns of binary picture elements for the whole component are fed to a controller 15, comprising a microprocessor, within which the picture is analyzed and a decision made, as will be described later, whether to accept or reject the component. In response to this binary decision, an air valve 16, is opened and a jet of air through nozzle 17 is directed to remove a rejected component from the track, depositing it back in the bowl of the feeder whence it will re-emerge later along track 11, but possibly with a different orientation. Given time, all the components in the bowl will pass along track 12 with a common, desired, orientation.

The operation of the controller 15 in producing the binary sorting decision from the camera output will first be described in terms of the functions provided by the microprocessor in the controller. An outline guide to the programming of the microprocessor needed to realize these functions will then be given.

The first function of the controller is to process the camera output to determine the position of the fence in the column of binary picture elements provided by a scan of the linear photodetector array. As previously noted, the camera is set so that the first detector of the array corresponds to a point inside the side fence of the track. Consequently the first set of detectors, up to that detector corresponding to the fence, sees black. The remainder see white except when a component passes. The number along the array of the first detector seeing white and to be used as the first of the column is held in memory storage and if ever the detector preceeding that one sees white the number is reduced by one. To provide tracking in the other direction the number is occasionally increased by one, for example, once for every 256 scans, and if no shift of the camera has occurred this increase of the detector number would be cancelled in the next scan, as described above. Using this correction method less accuracy in the initial positioning of the camera is required and some displacement during use is permitted. The number of detectors required is 64 plus an allowance for the accuracy of the initial positioning of the camera and its movement during use. In this example the processor takes the camera output for the next 64 picture elements after the transition near the fence.

The next function is to condense the 64 picture elements (pixels) to 16 states by taking them in blocks of 4 as shown in FIG. 3*a*, in which the column pixels are laid out in a horizontal line for compactness. If in a block the majority are black (B) then the state is black and similarly for white (W). If there are equal numbers of black and white pixels, the state is 'don't care' (X). A column of condensed black/white states will be referred to as a black/white pattern.

The arrival of a component at the slot is detected by the processor as the presence of any black states in a column. This condition initiates the cycle of events for that component.

Initially, the controller contains no information on the components to be sorted. Consequently a learning mode is first required in which information on the wanted and unwanted orientations of the component is acquired. The learning mode contains three phases. In the first and last phases components are fed past the slot in the correct orientation and in the second phase in other orientations. In the first two phases the processor forms a reference table of black/white patterns representing columns of pixels which are distinguishable from one another by the order and number of black/white states which they contain. Each entry in this table is allocated a distinctive identity. In the last phase a reference array is formed of the correct orientation of the component. This reference array comprises a compressed average sequence of identities which are obtained as the component passes the slot.

The condensed black/white patterns are stored in a first table in which the number of times that that pattern has appeared is also recorded. At the start of learning this table is empty. Following each scan, the condensed pattern obtained is compared with any existing members of the table. If an exact match is found the count for that pattern is incremented by one, otherwise the new pattern is added to the table. The beginning of such a first table is shown in FIG. 3*b*. This pattern storing continues until a predefined number of components have been scanned. Then, these patterns are taken in order of frequency of occurrence and modified to introduce a small amount of tolerance for subsequent matching processes, for example, during sorting. Generally this is done by introducing 'don't care' conditions where there are transitions between black and white. Examples of this are shown in FIG. 3*c*. In these examples it will be seen that if a condensed pattern contains a pair of blacks or a pair of whites set in a contrasting background, such a pair would be removed and replaced by a run of four 'don't care' states. This is avoided in FIG. 3*c* by producing two toleranced patterns for each original pattern. In each toleranced pattern only one or the other member of such a pair has the tolerancing operation applied to it. The new patterns are stored in a new second table, FIG. 3*d*, together with an identifier corresponding to the position of the source pattern in the first table. The toleranced patterns are stored in the same order in the new table, i.e. most frequent first. If a toleranced pattern is produced which is the same as a pattern already in the second table then the new pattern is ignored. This process continues until the second table reaches a predetermined length, for example, twenty entries. The number of entries in the first table depends upon the complexity of the component and fifty to two hundred entries is common in a typical system. The sequence of black/white patterns as scanned and condensed bears a resemblance to the component geometry. The sequence in the tables may bear very little resemblance to the component geometry since identical patterns may occur in widely separated parts of the component.

In the second stage of the learning process the components are fed in the wrong orientations. In this context simply reversing the direction of the feed will produce the same patterns as before, but in the reverse order, if the component has the same points of contact with the guiding surface at the side of the feeder. As a result no new information would be obtained. From other orientations a new set of patterns will generally be obtained. The process continues as before and a new list is formed as in the first table. Again these are modified to introduce tolerances and the resulting patterns are added to the end of the second table. If a pattern obtained from a wrong orientation matches any of the existing patterns obtained from correct orientation matches any of the existing patterns obtained from correct orientations it is ignored. A predetermined number of non-matching patterns, for example, twelve, are added to the table. The identifiers recorded with the patterns in this second part of the table include a code to show that they were obtained from components having wrong orientations and this is used to apply a penalty when scoring the matches during sorting.

Therefore, at the end of the second state of the learning process there exists a table of, for example, thirty-two toleranced patterns from the correct and incorrect orientations which constitutes the reference table of patterns, the identifiers corresponding to the codes A,B,C etc. In the second stage, wrong components are fed through if it is desired to separate a component from a mixture of components.

In the third stage the components are fed in the correct orientation and this time the direction of feeding is important. For each component each black/white pattern obtained is compared to the table of thirty two patterns previously formed. A pattern match is indicated when every black and every white state in an entry in the reference table is matched by a correspondingly positioned state in the black/white pattern offered. No match is necessary for 'don't care' states. The matching attempts are started from the top of the reference table, i.e. the most frequently occurring black/white pattern, and stop with the first successful match, although others may be possible further down the table. If no match is found the pattern offered is rejected. As each match occurs, its identity, A,B,C. etc is added to a list in the order in which it occurs as the component passes the slot. When the last component scan has occurred, as indicated by all white states in a scan, a list of identities is obtained, referred to as a long array of the component. FIG. 3*e* shows a typical long array.

The length of the long array is then reduced to give a short array. The long array will contain runs of the same identifying codes, or pixel columns. If, after some rearrangement as described below, these runs are shorter than a preset fraction, e.g. 2%, of the total array length, they are removed from the array. In the rest, each run is represented in the short array by one entry of the same identifying code but this one entry is repeated if the run exceeds another preset fraction, e.g. 10%. A run of 25%, for example, would result in three entries, FIG. 3(*e*). Before deleting short runs the following rearrangements are made to ensure a more realistic reduction in the presence of noise. For example, if there were small groups of a certain code, each group being smaller than the limit for removal, separated by single random codes of other types then all these codes would be removed by a simple condensation process. In the process used in this system the random codes are removed and the small groups of the same code are combined into one group which survives if the total number of codes exceeds the minimum limit. Some examples are given in FIG. 3(*e*). This method also prevents two small groups which have the same identity code and which are separated by a single entry of another code from producing two entries in the short array. The short array is shown below in FIG. 3*e*.

For the first component scanned in the third phase of the learning process, its short array is copied into a store assigned to a reference array signature or reference set of identities. Stored with each identity forming this reference array is the number of times that it has occurred in the short array so far. The short array obtained from the next component scanned is then compared and merged with the reference array. Normally the two are not identical and the second array may have codes, or identities, not present in the reference array, have codes missing and have a different overall length. The comparison and merging are performed in two stages, see FIG. 3*f*. First, an attempt is made to find blocks of at least three codes which appear in both arrays. The search starts from one end of the arrays and, with these ends aligned, the search for matching blocks is made. This is repeated with relative displacements of the arrays of one, two and three places in each direction until a block match is found. Once a code has been matched it is not considered for any later match. In the second stage an attempt is made to match any remaining codes in the reference array within the boundaries set by the blocks which have been matched. Where matches are made the counts for each code in the reference array are are increased by one. An attempt is now made to insert those codes which were not matched into the reference array. This is done if there is no doubt as to where they could fit. FIG. 3*f* shows this process. Continuous lines between codes in the upper, reference array and the lower new array indicate the first located blocks. Dotted lines indicate subsequent linkings and the arrow indicates a successful insertion. The second B in the new signature is not inserted because it could go on either side of the A in the reference array. The fourth row of codes is the new reference array so formed and the fifth row gives the new counts for each code for comparison with the top row of counts for the old reference array.

This is continued for the subsequent components. If the attempt to form a match with the reference array results in a low matching score then the component is ignored. A penalty for a match with a pattern which has been coded as having been derived from a wrongly oriented component is not applied at this stage. Sufficient components have been scanned when one of the patterns in the reference has reached a preset number of occurrences e.g. seven. The reference is then purged of those patterns which have occurred less than a given number of times, e.g. five. Those remaining are taken as the reference array or reference set which is used for the sorting process. It is unlikely that the reference array would contain a pattern coded as being from a component in the wrong orientation after the frequency limit, i.e. five times, has been applied but if it should happen this code is removed, to avoid the penalty, although the table is not rearranged.

The learning process is automatic and builds up to the reference array from the scanned patterns by the use of these relatively simple rules. As a result if the learning process is repeated slight differences can occur in the lists of patterns and there may be slight changes in the reference arrays obtained. These variations can arise from slight differences in the components used for the learning phase, their velocities and their positions on the track. Even so, there is little effect on the discrimination obtained during sorting between different components or between components in the right and wrong orientations.

As the conclusion of the learning mode, therefore, two pieces of information have been acquired by the controller. First, a reference table of black/white patterns from components in the desired and unwanted orientations has been built up. Second, a reference array of the component in the desired orientation has been formed comprising a shortened version of the average sequence of black/white patterns which occur as the component passes the scanned slot.

The process of compressing the sequence of columns non-linearly and of detecting single non-conforming columns is known generally in the art as time warping or sequence warping. Applications of such warping to speech and pattern analysis are given in an article by Weste, et al, in IEEE Trans. Computers Vol. C32, No. 8, August 1983.

The controller is now set into the sorting mode and a succession of components in various orientations scanned. As in the learning mode, the 64 black/white pixels from each column scan are reduced to 16 states as described with reference to FIG. 3*a*. As each column of 16 states is obtained it is compared with the reference table of black/white patterns and a match found using the same rules as for the learning mode. FIG. 3*h* shows a part of the reference table in the top four rows with codes, while the bottom five rows show typical condensed scans obtained together with the code matches assigned to them. The identity, or code, of columns is obtained and a long array for each component built up. The long array is compressed to a short array as in the learning mode.

The short array is now compared with the reference array. As in the comparison of arrays in the learning mode, the two are not normally identical. The measure of the degree of match between reference and unknown arrays which is used is the percentage of codes in the unknown array which match the reference array in the corresponding order, related to the total number of codes in the unknown array. The two stages of matching of the learning mode, described above with reference to FIG. 3*f* are again used, but there is no attempt to insert new codes.

The final matching score is converted to a percentage of the total number of codes in the unknown array and if adequate then the component is accepted as being in the required orientation. FIG. 3(*g*) shows an example of two block matches followed by four remaining matches making a total of 11 code matches in 13 codes, given an 84% match. Discrimination against incorrectly oriented components is improved using the fact that the reference list of black/white patterns includes some which will occur only when the component is in the incorrect orientation. In consequence these will appear in the arrays obtained from such components and, in calculating the matching score, are given a large negative value, e.g. −5.

The compression of a column described with reference with FIG. 3*a* resulted in 'don't care' states and in describing the operation of the system it is easier to refer to 'don't care' states as being distinguishable from '0' and '1'. In practical computer systems only '0' and '1' states exist. FIGS. 3*j* and 3*k*, which correspond to FIGS. 3*a* and 3*h* respectively, show how the effect of a 'dont't care' state is achieved. In FIG. 3*j* two condensed words, a 'black' word and a 'white' word are formed from each column. A group of four states containing either three or four blacks is condensed to a black or '1' in the 'black' word. If the group has only two or one blacks, it is condensed to a '0'. In the white word, the same process is carried out for whites in the groups. FIG. 3*k* shows how each identity is actually a pair of words, the 'black' word and the 'white' word. In the comparison of a column with the table, corresponding words are compared. The rule for a match is that for every '1' in the reference words the corresponding bit in the corresponding word of the scanned pair must be '1'. Zeros in the reference words are ignored in finding a match. This allows tolerance for small variations in the position of the objects with respect to the fence. Word pairs which find no match are ignored.

The microprocessor used as the basis of the controller may be a single board of the type currently available on the market using 16 bit data handling. At least 1500 words of read only memory (ROM) and 2500 words of random access memory (RAM) are needed. A Philips P870 is suitable. An interface is required to the linear array camera and to the air valve for deflecting components. Control buttons are provided for setting the controller into learn and sort modes.

Figure 4A:
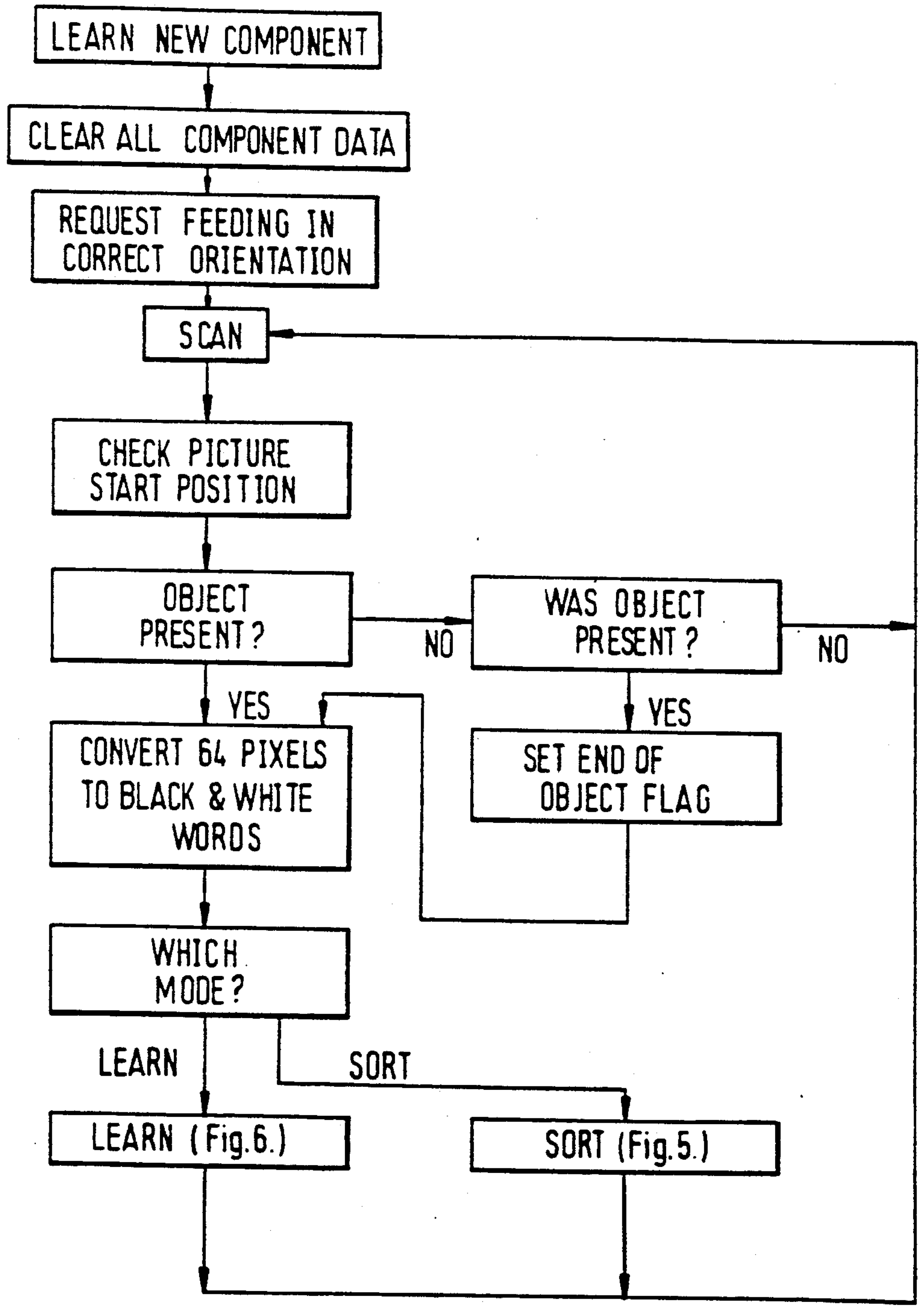
FIGS. 4,5 and 6*a* and 6*b* show flow charts as an outline guide to the programming of the microprocessor needed to realize learning and sorting of components.
Figure 5:
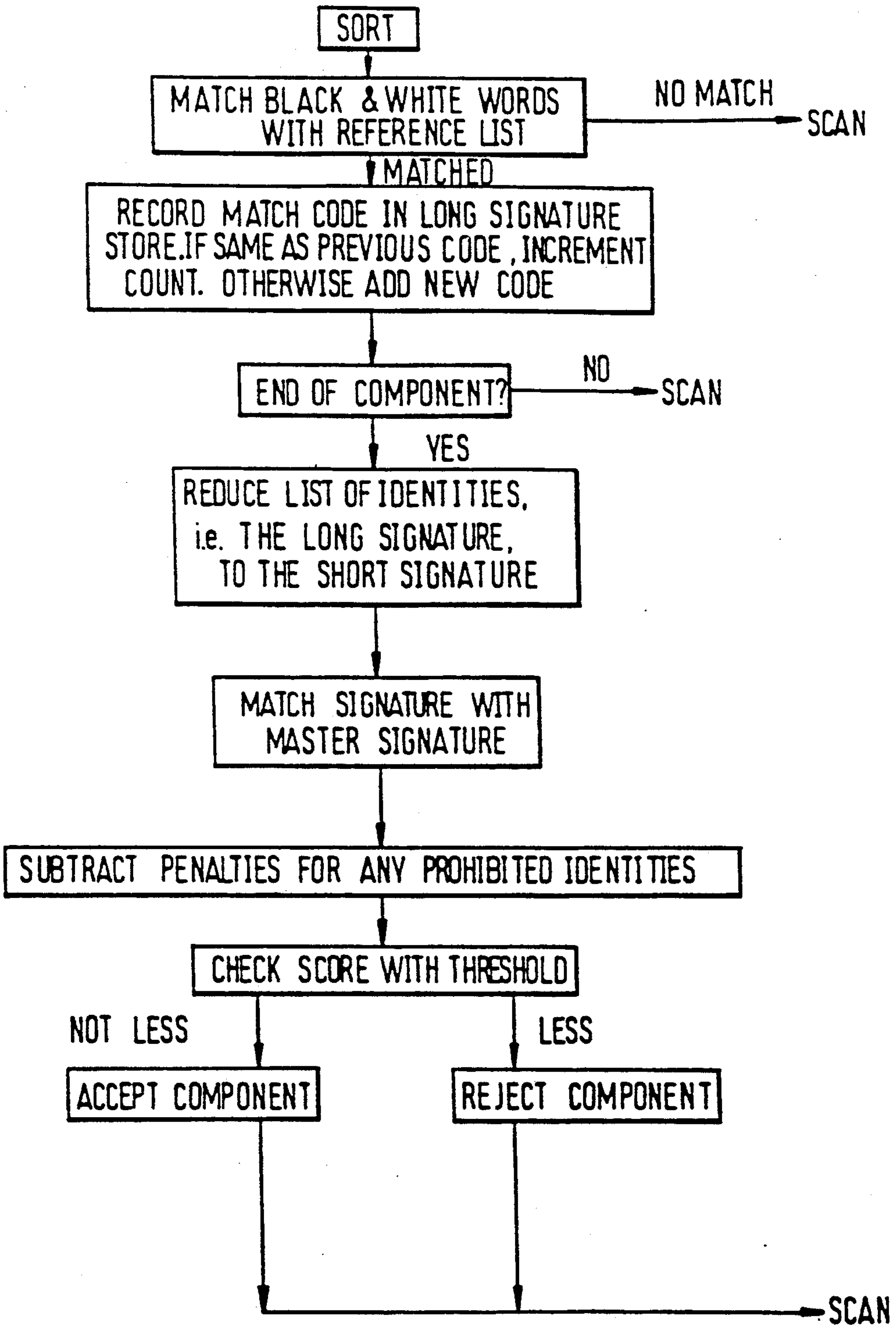
Figure 6A:
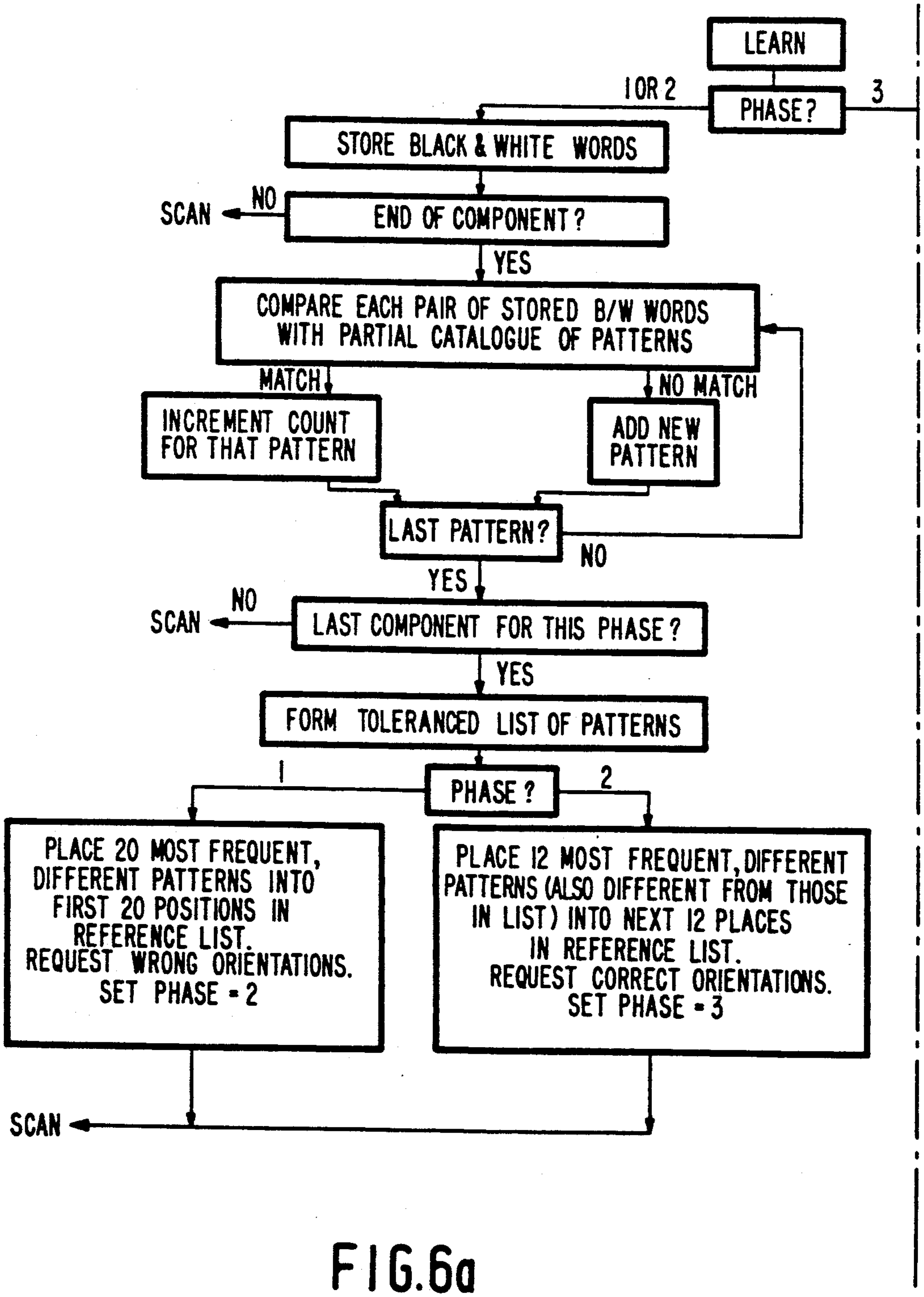
Figure 6B:
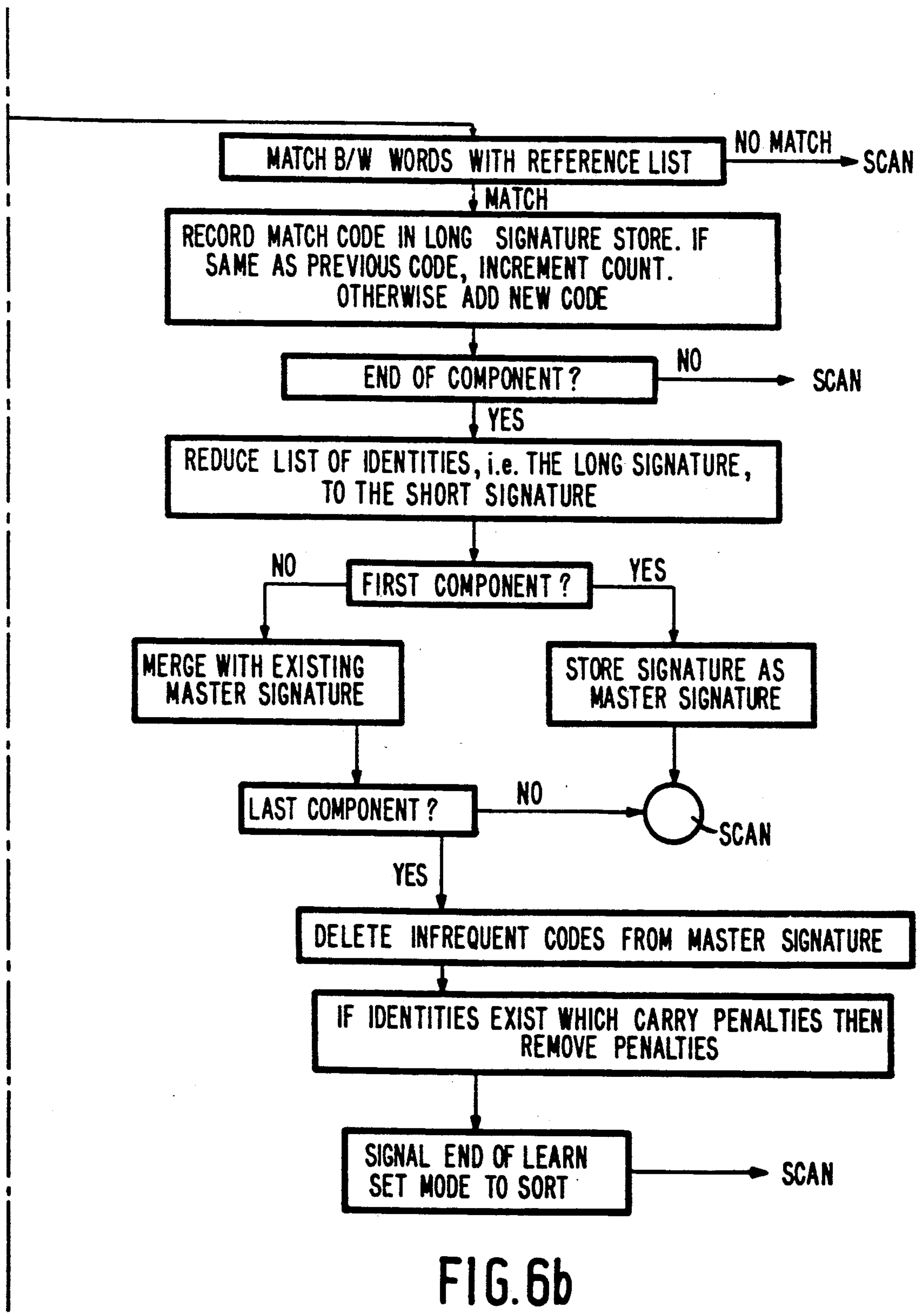

The flow charts shown in FIGS. 4, 5 and 6*a* and 6*b* give an outline guide to the programming of the microprocessor. FIG. 4 shows the basic cycle of operation of the sorter. Initially an instruction would have been given to start a learning cycle by pushing the appropriate button on the controller. Consequently on reaching the box 'LEARN' the process will move to the process shown in FIGS. 6*a* and 6*b*. At the end of the learning phase the mode is set to SORT with the result that on reaching 'Which mode?' the process shown in FIG. 5 will be followed. In FIG. 5, the sorting flowchart, the reduction of the list of identities and the matching of the array uses the process described above.

FIG. 6 shows the flowchart for learning. In phases 1 and 2 the component is fed in the correct and incorrect orientations respectively to enable the system to learn the types of patterns that occur and their frequency of occurrence. In phase 3 the component has to be fed in the correct orientation and the list of patterns now in a memory storage called REFERENCE are used to generate the long and then the short arrays. To ensure that no scans are missed during the learning phase the black and white words were placed in a long file called BW. This file is condensed into a store called CAT after each component has passed. If a fast processor is used it might be possible to enter the words directly into CAT. After the last component in phases 1 or 2 has been scanned the toleranced list IND is formed from CAT.

In phase 3 a long signature for each component is formed in a store called LIST. Each word of LIST consists of the identity and the number of consecutive occurrences of that identity. LIST is converted to the short array in a store SIG, and merged with the master array being formed in a store ITEM.

The recognition process used in the sorter described above does not explicitly use the existence of holes, edges or other specific features. Also, it does not rely upon a priori knowledge of particular dimensions of the object. Instead it develops a view of the object which incorporates both these aspects in a more general way. It requires no guidance or assistance from the operator except for the feeding of a few components in the required and wrong orientations.

This more general view of an object which is provided by the invention could be used in sorting dissimilar objects. A reference table of black/white patterns could be developed for each of the dissimilar objects, each object making a contribution to the negative fit part of the reference table of the other objects. Thus a generalized recognition and classification process is provided applicable in those cases in which the objects or characters are presented in one or only a few well defined orientations.

In the embodiment described, the camera comprised a linear array of photodiodes moving transversely relative to the object to scan the field within which the object is located. In other situations, a television camera may be used, avoiding the need for relative movement. The video output of the camera is then thresholded and sampled at discrete intervals along the lines of the television raster to produce the rows of the binarized picture, the columns being provided by corresponding samples in the lines. The television camera may be used when it is convenient to 'freeze' the object with only one frame scan of the raster. Alternatively, the lines of the television raster may be used as the columns of the present invention, the frame scan of the raster providing the effect of component motion.

In a practical system the reference table and the reference array could be stored in an electrically erasable programmable read only memory (EEPROM) so that this information is not lost when the system is switched off. Also, the tables and arrays of several different components could be built up gradually, but accessed immediately without need for learning when there is a change in the component to be sorted.

I claim:

1. An object sorting device for solid objects that are presented in a limited plurality of allowed orientations in a plane with respect to a longitudinal axis in said plane, said device comprising:

means for moving said objects in a direction along said longitudinal axis;

means for scanning successive objects each in a raster format to derive a raster waveform of each object;

means for binarizing the waveform of an object into a two-dimensional array of binary pixels comprising rows along the direction of said longitudinal axis and columns transverse to said longitudinal axis;

feature extraction means for extracting selected features from the two-dimensional binary array to produce a one-dimensional array comprising a plurality of elements each representative of the information content of a corresponding said column of binary pixels, said feature extraction means comprising run counting means for counting runs of successive identical elements of said one-dimensional array and for outputting only those runs having a predetermined minimum length at least equal to two to represent the selected features;

means fed by said feature extraction means for deriving a one-dimensional reference array from the scanning of a plurality of reference objects;

means for storing said reference array; and comparison means receiving the output from said feature extraction means and said storage means for comparing within a predetermined tolerance the one-dimensional array of an unknown object with said one-dimensional reference array to produce a binary object sorting signal for sorting objects in an undesired orientation from said track.

2. A device as claimed in claim 1, wherein said means for scanning said objects comprises a linear array of photodetectors transverse to said longitudinal axis, a fence having a portion parallel to said longitudinal axis adjacent said photodetector array, and means for moving said objects past said photodetector array and in view of said photodetector array;

outputs of the photodetectors being sampled at regularly spaced time intervals to produce said raster waveform;

said means for binarizing said waveform comprises means for comparing said output of each said photodetector to a threshold level, for assigning one binary value to a said output if it equals or exceeds said threshold level and for assigning the other binary value if it is less than said threshold level; and one said sampling of said photodetector array yielding one column of binary picture elements, and sampling while said object is in view of said photodetector array yielding rows of said columns of binary picture elements.

3. A device as claimed in claim 2, wherein said fence provides a distinctive signal in a first group of photodetectors viewing said fence, and said columns of binary pixels derived from said linear array of photodetectors are taken from a second group a photodetectors in said array adjoining said first group and extending away from said first group viewing said object, and said device has shifting means for shifting said second group of photodetectors to correspond to shifts in said first group so that movement of said photodetector array does not shift said object image.

4. A device as claimed in claim 1, wherein said feature extraction means further comprises column condensing means for dividing each said column of binary pixels into blocks each having an equal number of binary pixels, for assigning a binary value to each block equal to the majority binary value in said each block, for assigning a status other than a binary value if a said block does not have a majority binary value, and for forming a condensed column comprising said assigned values so that each said condensed column of said object comprises a pattern of assigned values corresponding to said blocks distinguishable by the order and number of assigned values in that said condensed column.

5. A device as claimed in claim 4, wherein said feature extraction means further comprises reference table forming means connected to the output of said column condensing means for forming a reference table comprising a list of said patterns, a respective pattern identity corresponding to each said pattern, and a corresponding count equal to the number of times each said pattern has occurred; and storage means for storing said reference table.

6. A device as claimed in claim 5, wherein said feature extraction means further comprises array forming means for producing a one dimensional array of said pattern identities from a plurality of said condensed columns derived from scanning a solid object, said array forming means searching said reference table for a column matching said column pattern for each condensed column in said plurality, if a matching column is found in said table said identity of the matching column is included in said array and if no matching column is found that said column is excluded from said array, said array having a total length and comprising runs of like identities, said runs being of varying length.

7. A device as claimed in claim 6, wherein said feature extraction means further comprises reduction means for reducing the length of said array to produce a short array, any said run shorter than a predetermined length being excluded from said short array, and each run longer than said predetermined length being represented in said short array by an entry of its respective pattern identity, said entry being repeated for each predetermined multiple that the length of said each run exceeds of a preset fraction of said total array length.

8. A device as claimed in claim 7, wherein said reference array deriving means comprises:

means for storing a first said short array obtained from scanning a first reference object in said plurality of reference objects as a first version of said reference array;

comparison means for comparing a next short array obtained from scanning the next reference object in said plurality with said first version;

means for matching identities present in said next short array with respective identities in corresponding locations in said reference array;

means for inserting identities present in said next short array which are not present in said first reference array into a corresponding location in said first reference array to obtain a new reference array; and means for counting the number of times each said identity in said master reference array has been matched by an identity in each said next short array and for storing said count and its respective identity; and said reference array deriving means being activated for each reference object in said plurality until a said count reaches a first predetermined number, said reference array being purged of any said identity occuring less than a second predetermined number of times.

9. A device as claimed in claim 8, wherein said reference array and each said next short array have a first identity and the length of each said next short array may be different than the length of said reference array;

said comparison means comprising:

means for aligning said first identity of said reference array with said first identity of said next short array;

means for searching in said reference array and said next short array for corresponding block runs comprising at least three identical identities;

means for shifting said next short array one identity with respect to said master reference array if said search is unsuccessful, said shifting continuing until said search is successful; and means for matching each said block run in said next short array with a corresponding said block run in said reference array, the regions between block runs in said master reference array defining a plurality of boundaries, identities between block runs in said next short array being matched with corresponding identities in said reference array within a respective said boundary; and sequence warping control means for determining a position where an identity in said next short array which does not match a corresponding identity in said reference array fits in said reference array within a respective said boundary and inserting said unmatched identity in said position in the reference array.

10. A device as claimed in claim 9, further comprising means for detecting a pair of two directly successive identities in a said array having a first and second value, respectively, that are preceded by a run of identities of said second value and followed by a run of identities of said first value and for then interchanging the sequence of said two directly successive identities for thereupon present all identities to said reduction means.

11. A device as claimed in claim 8, wherein said reference array comprises an additional set of a predetermined number of identities derived from scanning a second plurality of reference objects differing from said reference objects in said plurality and identities obtained from an unknown object which match identities corresponding to said additional set detract from a fit between said unknown object and said reference array.

12. A device as claimed in claim 11, wherein said reference objects in said plurality comprise a given object in a desired orientation and reference objects in said second plurality comprises said given object in an undesired orientation, said device sorting said object in said undesired orientation.

13. A device as claimed in claim 7, further comprising means for detecting a pair of two directly successive identities in a said array having a first and second value, respectively, that are preceded by a run of identities of said second value and followed by a run of identities of said first value and for then interchanging said the sequence of said two directly successive identities for thereupon presenting all identities to said reduction means.

14. A device as claimed in claim 6, further comprising means for comparing said column patterns of said condensed columns with said patterns stored in said table within a predetermined tolerance.

15. A device as claimed in claim 14, wherein said means for comparing said column patterns within a predetermined tolerance comprises means for modifying said patterns in said table to include a tolerance for subsequent matching and for storing each modified pattern with a corresponding position identifier indicating the position in the reference table of the corresponding pattern for each modified pattern, and said array forming means searching said modified patterns in said reference table for a said matching column.

16. A device as claimed in claim 1, wherein said feature extraction means further comprises:

reference table forming means for forming a reference table of unique columns obtained from scanning a plurality of reference objects, said table comprising unique columns and a distinctive identifier for each unique column that has occurred more than a predetermined number of times.

17. A device as claimed in claim 16, wherein said reference objects are identical and said reference array is obtained by scanning a first plurality of said reference objects in a desired orientation and a second plurality of said reference objects in undesired orientations; and identifiers in said array corresponding to features of reference objects in undesired orientations being used to apply a penalty in the comparison of the array of an unknown object with said reference array.

* * * * *